No. 819,386. PATENTED MAY 1, 1906.
H. C. TURNER.
SHOCK ABSORBER.
APPLICATION FILED AUG. 31, 1905.
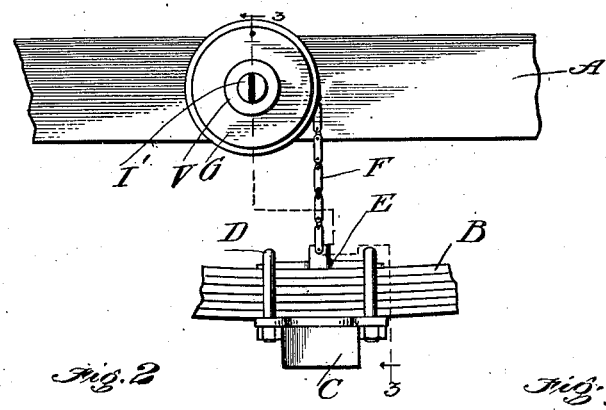
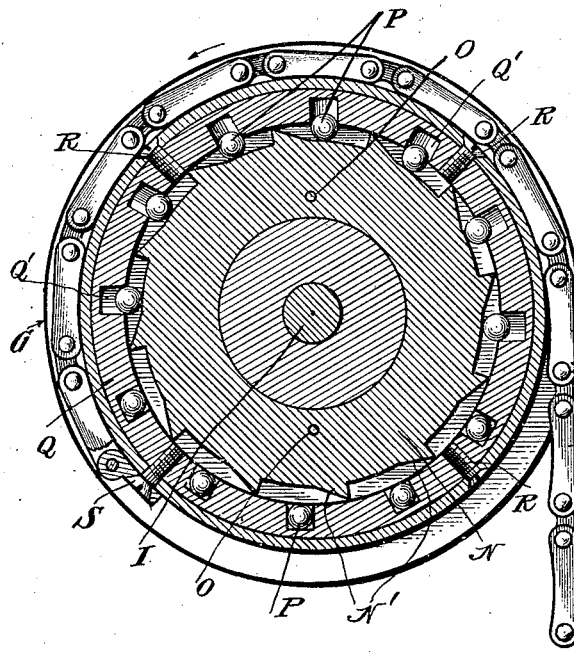
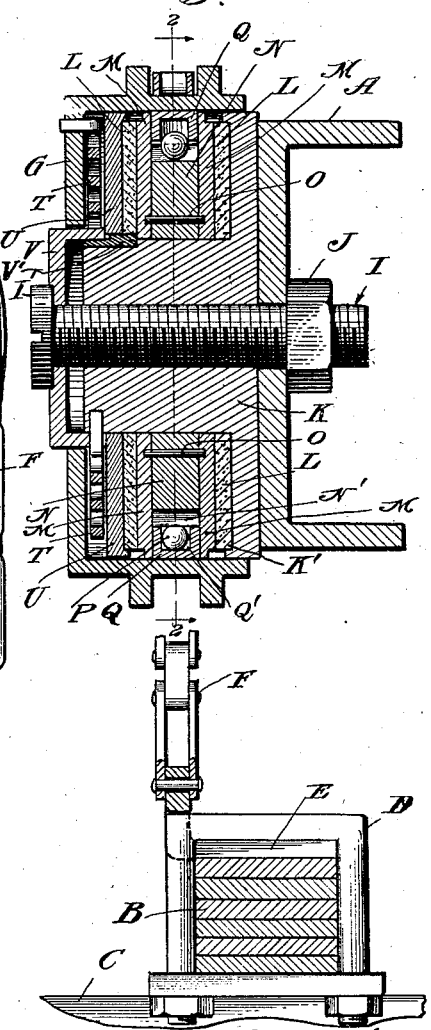
Witnesses
Inventor
Harry C. Turner
by Hazard & Harpham
Attorneys

UNITED STATES PATENT OFFICE.

HARRY C. TURNER, OF LOS ANGELES, CALIFORNIA.

SHOCK-ABSORBER.

No. 819,386.  Specification of Letters Patent.  Patented May 1, 1906.

Application filed August 31, 1905. Serial No. 276,629.

*To all whom it may concern:*

Be it known that I, HARRY COBURN TURNER, a citizen of the United States, residing at Los Angeles, in the county of Los Angeles and State of California, have invented new and useful Improvements in Shock-Absorbers, of which the following is a specification.

The object of my invention is to provide a simple and reliable device which may be easily attached to or removed from a motor car or carriage of any description having springs, which will in a large measure prevent the sudden jar and shock occasioned in passing rapidly over inequalities in the surface of the road-bed, my invention being more particularly designed for the purpose of permitting the spring to retain its full resiliency when running-gear of the car is thrown upward suddenly as the wheel or wheels strike an elevation in the road and to prevent sudden upward impulses of the spring against the body of the car resulting therefrom, the upward impulse of the spring or springs being absorbed by a ratchet-clutch mechanism hereinafter described, preventing thereby the disagreeable upward throw of the car-body. I accomplish this object by means of a device described herein and shown in the accompanying drawings, in which—

Figure 1 is an elevation of my device in place on a car, a fragment only of the frame of the car and of the supporting-spring being shown. Fig. 2 is a central vertical section of the ratchet and adjustable clutch mechanism, taken on line 2 2 of Fig. 3. Fig. 3 is a transverse central vertical section of the ratchet-and-clutch mechanism, taken on line 3 3 of Fig. 1.

In the drawings, A is the frame, which supports the body of the car to which the device is secured and which rests upon the main spring B. The usual clips D secure the springs B to the axle C and extend above and hold the plate E in rigid engagement with the top of the spring. A sprocket-chain F is secured at its lower end to the plate E and extends upwardly therefrom and is operatively connected at its upper end with the ratchet-casing G. In order to permit the spring when the wheels strike an obstruction to be thrown rapidly upward in the direction of the body of the car and at the same time prevent the spring from exerting its normal strength to suddenly throw the body of the car upwardly and away from the spring, I have provided a ball-ratchet combined with an adjustable clutch which will permit the spring to retain its unlimited resiliency when the axle is thrown up suddenly in the direction of the body of the car, but will prevent the spring from immediately exerting its full impulse upward and permit it to exert that impulse gradually and elevate the body of the car easily and prevent the usual jar occasioned thereby when no clutch therefor is provided. The ratchet-clutch mechanism contained in the casing G is detachably secured to the frame A of the car, as shown in Fig. 1, by locking-bolt I, which extends centrally therethrough and also through a hole in the frame and is detachably held in place on the frame by the nut J. This bolt is screw-threaded its entire length and has on its outer end a head I' with a screw-driver slot therein, affording means to tighten the clutch device. Lying on the outer face of the annular clutch-leather L is an annular washer U, which is keyed to the inner hub K by a key V'. Outside of and resting against this annular washer is the outer hub member V, against which the head I' of the bolt bears. By the rotation of the bolt I the head I' thereof will carry the hub V inwardly against the friction-ring U, which in turn bears against the leather clutch-rings L and serves to adjustably tighten the clutches to any extent desired.

Countersunk in the main body portion or hub K is an annular seat K' for the reception of the annular leather washer L, of which there are two, one on each side of the ratchet-wheel. This inner hub member K is screw-threaded for engagement with the bolt I, affording means, as herein explained, to regulate the clutches.

Next to the annular leather washers L and forming the inside bearing therefor and on the outside of the ratchet-wheel are the annular flat metallic rings M. These annular rings are secured to the ratchet-wheel N (and moved therewith) by the keys O, which extend through the ratchet-wheel and project outwardly therefrom on either side into and engage the annular rings M. The conventional ratchet-wheel N is provided with a plurality of ratchet-teeth N' for engagement with the ratchet-balls P at certain points in its movement. Surrounding the ratchet-wheel is the outer ratchet member Q, having pockets Q' for the reception of the ratchet-balls. The outer ratchet member Q is detachably secured to the ratchet-casing G by the screws R. The sprocket-chain F is secured to the ratchet-casing by the screw S. (See Fig. 2.)

When the body of the car is elevated, increasing the distance between it and the spring B, it will unwind the ratchet-chain and wind up at the same time the coiled spring T. (Shown in cross-section in Fig. 3.) The impulse of this spring will when the body of the car drops down in the direction of the running-gear, decreasing the distance between the body of the car and the running-gear, cause the ratchet to rotate in the direction indicated by the arrow-head and take up the slack in the sprocket-chain F. Immediately the body commences an upward movement away from the spring the ratchet will operate to prevent too sudden a rise of the body. The power of the main spring B being greater than the frictional resistance on the clutches will compel the body of the car to rise; but the ratchet-clutch will prevent it from jumping up suddenly, as it would do if the clutch did not catch it and prevent it from so doing.

Having described my invention, what I claim as new, and desire to secure by Letters Patent, is—

1. A shock-absorber comprising inner and outer hub members, a clutch, means for tightening the clutch, a ratchet-casing, a spring connecting the ratchet-casing with the inner hub and a flexible connection connected at one end to the ratchet-casing, the absorber adapted to be secured to one portion of a vehicle and the outer end of the flexible connection to another whereby to absorb the shock caused by one in the other.

2. A shock-absorber comprising an inner and outer hub, clutch mechanism, means for tightening the clutch, comprising a locking-bolt having a screw-thread which turns in a thread in the inner hub with its head bearing against the outer hub, a ratchet-casing, a spring connecting the ratchet-casing and inner hub, and a flexible connection connected at one end to the ratchet-casing, the absorber adapted to be secured to one portion of a vehicle and the outer end of the flexible connection to another whereby to absorb the shock caused by one in the other.

3. In a shock-absorber, the combination with an inner and outer hub, a locking-bolt connecting the two, a ratchet-wheel mounted on the inner hub and provided with ratchet-teeth, an outer ratchet member having pockets therein, and ratchet-balls interposed between the outer and inner ratchet members, of annular rings connected with the inner ratchet member, washers, a friction-ring, the locking-bolt adapted to be turned to tighten the rings and washers, a ratchet-casing, a spring extending from the casing to the inner hub and a flexible connection connected at one end to the ratchet-casing.

4. The herein-described shock-absorber, comprising inner and outer hub members, a bolt extending centrally therethrough and having external threads thereon, the inner hub member being provided with a central screw-threaded bore for the reception of the locking-bolt; a ratchet-wheel revolubly and concentrically mounted on said inner hub member and provided with ratchet-teeth; an outer ratchet member disposed concentrically with and on the outside of said ratchet-wheel and being provided on the inside thereof with ratchet-ball seats, ratchet-balls in said seats; a coiled spring secured at one end on said inner hub member, the outer member of said spring being secured to the outer casing of the ratchet; a sprocket-chain secured to the ratchet-casing at one end, the other end of said sprocket-chain being secured to the running-gear; annular leather washers concentrically placed on said inner hub member and adapted to be pressed together and cause frictional engagement between the hub member and the ratchet-casing.

In witness that I claim the foregoing I have hereunto subscribed my name this 22d day of August, 1905.

HARRY C. TURNER.

Witnesses:
HENRY T. HAZARD,
G. E. HARPHAM.